US012677086B2

(12) United States Patent
Brinck et al.

(10) Patent No.: US 12,677,086 B2
(45) Date of Patent: Jul. 7, 2026

(54) HEARING DEVICE

(71) Applicant: GN Hearing A/S, Ballerup (DK)

(72) Inventors: Jakob Brinck, Ballerup (DK); Finn Hansen, Smørum (DK); Tharsiny Thanendran, Copenhagen V (DK)

(73) Assignee: GN HEARING A/S, Ballerup (DK)

( * ) Notice: Subject to any disclaimer, the term of this patent is extended or adjusted under 35 U.S.C. 154(b) by 145 days.

(21) Appl. No.: 18/604,285

(22) Filed: Mar. 13, 2024

(65) Prior Publication Data

US 2024/0334107 A1 Oct. 3, 2024

(30) Foreign Application Priority Data

Mar. 31, 2023 (EP) .................................... 23165807

(51) Int. Cl.
*H04R 1/08* (2006.01)
*H04R 25/00* (2006.01)

(52) U.S. Cl.
CPC ............... *H04R 1/08* (2013.01); *H04R 25/65* (2013.01)

(58) Field of Classification Search
CPC ......... H04R 1/08; H04R 25/65; H04R 25/604
See application file for complete search history.

(56) References Cited

U.S. PATENT DOCUMENTS 3,529,102 A 9/1970 Rosenstand
10,117,027 B2 10/2018 Pahl
2003/0031336 A1 * 2/2003 Harrison ............... H04R 25/48 381/322
2014/0241560 A1 8/2014 Shimizu

FOREIGN PATENT DOCUMENTS

KR 100470694 B1 3/2005

OTHER PUBLICATIONS

Foreign Search Report for EP Patent Appln. No. 23165807.1 dated Sep. 22, 2023.
Foreign Exam Report for EP Patent Appln. No. 23 165 807.1 dated Mar. 25, 2026.

* cited by examiner

*Primary Examiner* — Tuan D Nguyen
(74) *Attorney, Agent, or Firm* — Vista IP Law Group, LLP

(57) ABSTRACT

Disclosed is a hearing device. The hearing device comprises a housing comprising an opening in a portion of the housing. The hearing device further comprises a microphone arranged inside the housing and arranged adjacent to the opening in the portion of the housing. The microphone is configured to receive sounds from the surroundings or a user's ear canal through the opening. The hearing device further comprises a force element arranged on a first side of the microphone. The first side is opposite to the housing at the opening in the housing. The force element is configured to provide support for the microphone.

22 Claims, 4 Drawing Sheets

HEARING DEVICE

RELATED APPLICATION DATA

This application claims priority to, and the benefit of, European Patent Application No. 23165807.1 filed on Mar. 31, 2023, pending. The entire disclosure of the above application is expressly incorporated by reference herein.

FIELD

The present disclosure relates to hearing devices. More specifically, the disclosure relates to a hearing device comprising a housing comprising an opening in a portion of the housing and a microphone arranged adjacent to the opening of the housing.

BACKGROUND

During last years, hearing devices such as in-the-ear (ITE) hearing devices and behind-the-ear (BTE) hearing devices have developed significantly e.g. in terms of device performance and size reduction. Such hearing devices typically comprise a microphone which receives sound from the surroundings. The microphone is typically arranged adjacent to an opening in a housing of the hearing device to be able to receive sound from the surroundings. The received sound is then directed into an ear canal of a user by the hearing device. In typical hearing devices the microphone is implemented into the hearing device as part of a stack of components further comprising one or more protective elements which protects the microphone in several different ways. Such stack of components may be known as a microphone stack. The one or more protective elements may prevent dusts and particles from entering into the microphone opening, prevent leakage of unwanted sound into the microphone, provide vibration dampening and/or shock absorbance around the microphone and/or provide prober position/mounting of the microphone within the hearing device. Such microphone stacks may take up more space within the hearing device than desired. In order to address the above mentioned problem without being forced to go on compromise with either the hearing device performance or the size of the hearing device, there is a need to provide an improved hearing device with as many protective elements as possible around the microphone taking up as little space as possible within the hearing device.

SUMMARY

It is an object of the inventive concept to provide a microphone stack without removing any of the protective elements from the microphone stack and still being able to reduce the size of the hearing device. It is another object to provide for an improved hearing device in terms of acoustic performance, stability and robustness.

Disclosed is a hearing device. The hearing device comprises a housing. The housing comprises an opening in a portion of the housing. The hearing device further comprises a microphone arranged inside the housing. The microphone is arranged adjacent to the opening in the portion of the housing. The microphone is configured to receive sounds from the surroundings or a user's ear canal through the opening. The hearing device further comprises a force element. The force element is arranged on a first side of the microphone. The first side is opposite to the housing at the opening in the housing. The force element is configured to provide support for the microphone.

The first side of the microphone is a side of the microphone not facing the portion of the housing at the opening in the housing. The first side may correspond to a first or a second surface of the microphone. The force element is arranged on or adjacent to the first or second surface of the microphone. The first surface may be a top surface of the microphone e.g. a surface of the microphone not connected to a printed circuit board (PCB). The second surface may be a bottom surface of the microphone e.g. a surface of the microphone connected to the PCB. By adjacent is meant that the force element is arranged in close proximity to the first or second surface of the microphone. The force element may be arranged on and in contact with the first or the second surface of the microphone. For instance, there may be another component of element arranged in between the first or second surface of the microphone and the force element. The force element may be arranged between the first or second surface of the microphone and a support surface of the hearing device. The support surface of the hearing device may be part of a frame structure arranged inside the hearing device.

It is an advantage of the inventive concept that the force element is arranged on the first side of the microphone, the first side being opposite to the housing at the opening in the housing. This is because arranging the force element on the first side of the microphone allows for arranging the force element close to a middle/centre of the hearing device. The middle/centre of the hearing device often comprises an empty space. Thus, arranging the force element on the first side of the microphone allows for utilizing such empty space in the middle/centre of the hearing device in an efficient manner. Thereby, the inventive concept allows for providing the hearing device with a force element without increasing a size of the housing of the hearing device to provide room for such force element. Thus, the inventive concept allows for providing a smaller hearing device comprising the force element, compared to the conventional hearing devices comprising the force element that require extra space for such force element.

It is another advantage of the inventive concept that the force element may allow for taking up tolerances i.e. production variations in a stack of components arranged adjacent to the opening at the portion of the housing, wherein the stack of components may comprise a microphone and one or more protective elements arranged around the microphone. The tolerances may be due to variation in size and/or shape of the microphone or one or more of the protective elements. The arranging of the force element on the first side of the microphone allows for providing an improved hearing device that works in a stable manner even with tolerances in the stack of components arranged adjacent to the opening at the portion of the housing e.g. variations in shape and sizes, such as thicknesses, of the components arranged adjacent to the opening at the portion of the housing.

It is yet another advantage of the inventive concept that the force element allows for providing a force to the microphone towards the opening in the housing of the hearing device, as the force element force/press/urge the microphone towards the portion of the housing of the hearing device, and optionally any protection elements between the microphone and the portion of the housing of the hearing device, keeping them together. Thereby, the presence of the force element allows for an improved and stable assembly of the hearing device.

It is yet another advantage of the inventive concept that the force element may allow for vibration damping, as the force element may prevent or at least mitigate vibration propagation in the hearing device. This is because the force element may prevent or at least mitigate vibration propagation from other components within the hearing device to the microphone, such as from a receiver through the support surface of the hearing device to the microphone and thus allows for a more stable hearing device.

It is yet another advantage of the inventive concept that the force element may improve an acoustic sealing, wherein the acoustic sealing is configured to prevent sound received through the opening in the hearing device to leak into the hearing device and/or prevent that unwanted sounds from within the hearing device enters a microphone opening in the microphone. This is because the force element applies the force to the first side of the microphone and towards the opening in the housing of the hearing device. The force element may thereby close gaps in a sound path between the opening in the hearing device housing and the microphone opening and/or gabs between further protective elements defining the sound path between the hearing device housing and the microphone. Thus, the force element may both prevent or at least mitigate leakage of sound entering the opening in the hearing device housing into the hearing device and/or sounds from within the hearing device to enter the microphone opening.

The hearing device may be any of an ITE, BTE, Receiver-in-Ear (RIE), Microphone-and-Receiver-in-Ear (MaRIE) type hearing devices.

The microphone is arranged adjacent to the opening in the portion of the housing. By the adjacent is hereby meant close to/next to the opening in the portion of the housing. The microphone may have a microphone opening. The microphone opening may be arranged in communication with the opening in the portion of the housing. The microphone may be any microphone suitable for a hearing device.

The microphone comprises the first and second surfaces, wherein the second surface is opposite the first surface. The microphone i.e. the second surface of the microphone may be mounted, such as soldered, on/to a printed circuit board assembly (PCBA). The microphone may be a top port microphone. The microphone may be a bottom port microphone. In case of a top port microphone the microphone opening is arranged at/in the first surface of the microphone. In case of a bottom port microphone the microphone opening is arranged at/in the second surface of the microphone. In the case of the top port microphone, the PCBA may be arranged between the second surface of the microphone and the force element. In the case of the top port microphone, the microphone opening may be arranged in communication with the opening in the portion of the housing. In case of the top port microphone the second surface of the microphone may correspond to/face the first side of the microphone. In the case of the bottom port microphone, the PCBA may be arranged between the portion of the housing and the microphone. In the case of the bottom port microphone, the microphone opening may be arranged in communication with the opening in the portion of the housing. In the case of the bottom port microphone, the PCBA may comprise a PCBA opening allowing passage of sound from the opening in the portion of the housing to the microphone opening. In case of the bottom port microphone the first surface of the microphone may correspond to/face the first side of the microphone.

In an embodiment, the hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The hearing device may be embodied in various housing styles or form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprise in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device may comprise one or more antenna(s) configured for wireless communication.

The one or more antenna(s) may comprise an electric antenna. The electric antenna may be configured for wireless communication at a first frequency. The first frequency may be above 800 MHZ, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter (s), smart computer(s) and/or distributed microphone array (s) associated with a wireless transmitter. The wireless input signal(s) may origin from another hearing device, e.g., as part of a binaural hearing system and/or from one or more accessory device(s), such as a smartphone and/or a smart watch.

In an embodiment, the hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the hearing device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

In some embodiments, the force element is configured to provide a force on the first side of the microphone, urging the microphone towards the portion of the housing, as defined above. In some embodiments, the force is in the range of 0.1 N to 5 N.

The force element may be arranged between the first side of the microphone and the support surface. i.e. the force element may be arranged between the first surface of the microphone and the support surface or between the second surface of the microphone, such as between a surface of the PCBA not facing the microphone, and the support surface.

In some embodiments, the force element is configured to take up tolerances and/or to provide vibration dampening and/or provide shock absorbance, and/or provide an acoustic sealing, as defined above.

In some embodiments, the opening in the portion of the housing is configured to point towards the surroundings in a first direction, when the hearing device is worn by a user in its intended position in/at the user's ear. The microphone may have a microphone opening in a first or second surface of the microphone. The first or second surface may be configured to extend in a second direction. There may be an angle between the first direction and the second direction. The angle may be between 45 degrees to 135 degrees. A third direction may be perpendicular to the second direction.

Alternatively, in case of an in-ear microphone, the opening in the portion of the housing is configured to point into the user's ear canal in a first direction, when the hearing device is worn by a user in its intended position in/at the user's ear.

The first and/or second surface of the microphone may extend perpendicular to the first direction defined by the opening in the portion of the housing. The first and/or second surface of the microphone may extend with the angle of at least 45 degrees with respect to the first direction defined by the opening in the portion of the housing. Thereby the microphone and the force element, arranged on the first side of the microphone, may be arranged in a flexible manner with respect to the first direction. This in turn may allow for providing an improved hearing device in a more flexible manner.

In some embodiments, the force element is configured to urge the microphone towards the housing of the hearing device in the third direction. Thereby, the presence of the force element allows for an improved and stable assembly of the hearing device.

In some embodiments, the hearing device further comprises a support element for the force element. The support element may provide support for the force element. The support element may in turn provide additional support for the microphone i.e. additional support to the support provided by the force element for the microphone. The support element may be arranged on the first side of the microphone. The support element may be arranged on/against a surface of the force element not facing the first or second surface of the microphone. The surface of the force element, not facing the first or second surface of the microphone, may be arranged opposite to the surface of the force element facing the first or second surface of the microphone. The support element may comprise or be part of any of or any combination of a frame structure within the hearing device, a protrusion extending from the hearing device housing, etc. The support element may be made of plastic. The support element may be a rigid support element, such as a non-deformable support element. The housing and the frame may be made of the same plastic or different plastics.

In some embodiments, the force element comprises a foam. The foam may be any conventional and commercially available foam for the hearing device. The foam may be a poron foam.

In some embodiments, the foam is a compressible foam. Thereby, the compressible foam may facilitate providing the force to the microphone and towards the opening in the portion of the housing. The compressible foam may facilitate vibration damping and/or shock absorbance.

In some embodiments, a thickness the foam in an uncompressed state is in the range of 0.4 mm to 10 mm, such as 0.8 mm to 5 mm, such as 1.6 mm to 2.5 mm, such as 1 mm along the third direction (D3). In some embodiments, the foam has a density in the range of 100 $kg/m^3$ to 500 $kg/m^3$, such as 200 $kg/m^3$, such as 300 $kg/m^3$, such as 400 $kg/m^3$. In some embodiments, the compressible foam has a compression in the range of 5% to 80% such as 10% to 70%, such as 20% to 60%, such as 30% to 50%, such as 40%.

The thickness and/or the density and/or the compression of the foam facilitates the foam to provide a force, and/or to take up tolerances and/or to provide vibration dampening and/or to provide shock absorbance and/or to provide an acoustic sealing. A thickness the foam in a compressed state may be about 50% of the thickness of the foam in the uncompressed state. For instance, the thickness of the foam in the compressed state may be in the range of 0.2 mm to 5 mm such as 0.4 mm to 3 mm, such as 1 mm to 2 mm.

In some embodiments, the compressible foam in a compressed state is configured to provide a force on the first side of the microphone, the force being in the range of 0.1 N to 5 N. The compressible foam may be arranged between the first side of the microphone and the support element. I.e. the compressible foam may be arranged between the first surface of the microphone and the support element or between the second surface of the microphone, such as between a surface of the PCBA not facing the microphone, and the support element.

In some embodiments, the hearing device further comprises a filter device, wherein the filter device is arranged at the opening in the portion of the housing.

The filter device may comprise a mesh, a first adhesive element, and a second adhesive element. The mesh may comprise a first portion and a second portion. The second portion of the mesh may surround the first portion of the mesh. The first adhesive element and the second adhesive element of the filter device may be arranged on opposite surfaces of the mesh at the second portion of the mesh. The first adhesive element and the second adhesive element may be pressed into the mesh to form a closed portion of the filter device. The first portion of the mesh may form an open portion of the filter device. The open portion of the filter device may be configured to allow sound passing through the mesh. The closed portion of the filter device may be configured to prevent sound from passing through the mesh.

The first adhesive element and the second adhesive element may be in the form of a first adhesive layer and a second adhesive layer. The first adhesive element and the second adhesive element may be in the form of double-sided tapes.

The microphone may comprise a second side. The second side of the microphone may be opposite to the first side of the microphone. The filter device may be arranged on the second side of the microphone at the opening in the portion of the housing. For instance, the filter device may be arranged between the portion of the housing and the first surface of the microphone by means of the double-sided tapes. Alternatively, the filter device may be arranged between the PCBA and the portion of the housing at the opening, such as between the surface of the PCBA opposite to the surface of the PCBA facing the microphone and the portion of the housing at the opening, by means of the double-sided tapes.

In some embodiments, the hearing device further comprises a sealing element. The sealing element may be arranged adjacent to the filter device.

The sealing element may be arranged between the filter device and the microphone, such as between the filter device and the first surface of the microphone. The sealing element may be arranged between the filter device and the PCBA, such as between the filter device and the surface of the PCBA opposite to the surface of the PCBA facing the microphone. The sealing element may be arranged between the portion of the housing and the filter device. The sealing element may facilitate assembling of the hearing device. The sealing element may allow for assembling the hearing device without e.g. gluing the filter device to the portion of the housing or PCBA or the microphone. Thereby, the sealing element may allow for dissembling the hearing device in a simple and user-friendly manner, as the components of the hearing device may be easily disassembled from each other in case of a need of replacing certain parts, such as the filter device, the sealing element, the microphone, etc. By adjacent is meant that the filter device is arranged immediately preceding or following the filter device and/or at least in close proximity to the filter device.

The sealing element may comprise an open portion and a closed portion. The open portion may be arranged at an inner portion of the sealing element. The open portion of the sealing element may be arranged in a manner aligned with the open portion of the filter device to allow for sound passage. For instance, the sealing element may be in the form of a ring. In this case, the open portion of the ring may be arranged above or under the open portion of the filter device to allow for sound passage. The closed portion of the sealing element may be arranged adjacent to the closed portion of the filter device to block for sound passage. In the case of the sealing element being in the form of the ring, the closed portion of the ring may be arranged above or under the closed portion of the filter device to prevent sound passage. The closed portion of the sealing element may cover/enclose the closed portion of the filter device completely. The closed portion of the sealing element may at least cover/enclose the closed portion of the filter device partially.

The sealing element may comprise silicon. For instance, the sealing element may be in the form of a silicon ring.

In some embodiments, the force element, the microphone and the filter device, are stacked in the respective order along a third direction between the support element and the portion of the housing. The third direction may be perpendicular to the second direction. The stack i.e. the microphone stack comprising the force element, the microphone and the filter device may be arranged within the hearing device immediately preceding or following the opening at the portion of the housing and/or at least in close proximity to the opening at the portion of the housing.

The force element, the microphone and the filter device may be stacked in the respective order along the third direction toward/at the opening in the portion of the housing. The respective stack order allows for the force element to be arranged close to the middle/centre of the hearing device. Thereby, the respective stack order may allow for providing the hearing device with the force element without increasing the size of the housing of the hearing device to provide room for the force element.

The sealing element may be arranged above or below the filter device along the third direction in the respective stack order. The PCBA may be arranged above or below the microphone along the third direction in the respective stack order. The third direction may be parallel with the first direction. The third direction may not be parallel with the first direction.

The present disclosure relates to the hearing device described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
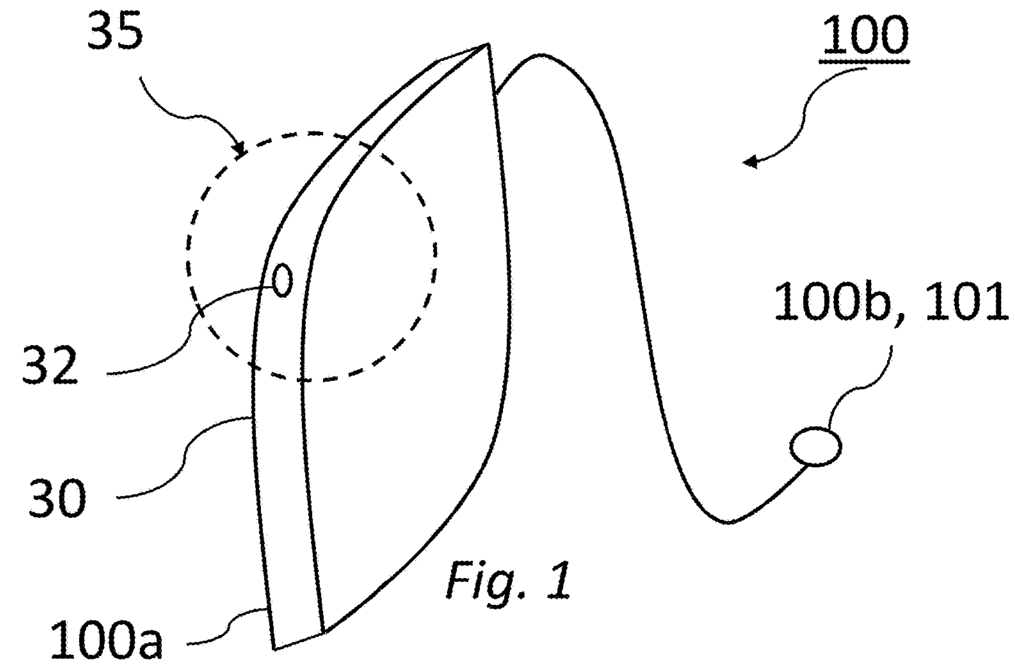
FIG. 1 schematically illustrates an exemplary hearing device 100 comprising a housing 30, FIG. 2*a* schematically illustrates a cross-sectional view of an exemplary portion 35 of a housing 30 of a hearing device 100 and a bottom port microphone 120, FIGS. 2*b* and 2*c* schematically illustrate a magnified side view and a top view of a filter device 10 of the hearing device 100 shown in FIG. 2*a*, respectively, FIG. 2*d* schematically illustrates a cross-sectional view of the exemplary portion 35 of a housing 30 of a hearing device 100 and a top port microphone 120, FIG. 3*a* schematically illustrates yet another cross-sectional view of an exemplary portion 35 of a housing 30 of a hearing device 100 and a bottom port microphone 120, and FIG. 3*b* schematically illustrates yet another cross-sectional view of an exemplary portion 35 of a housing 30 of a hearing device 100 and a bottom port microphone 120.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an exemplary hearing device 100. The hearing device 100 shown in FIG. 1 is a RIE or a MaRIE type hearing device 100. The hearing device 100 comprises a BTE unit 100*a* and a RIE or a MaRIE unit 100*b*. Alternatively, the hearing device 100 may be an ITE or a BTE type hearing device. The hearing device 100 i.e. the BTE unit 100*a* of the hearing device 100 comprises a housing 30. The housing 30 comprises an opening 32 in a portion 35 of the housing 30. The housing 30 may comprise a plurality, such as two, openings 32, each in a respective portion of the housing 30. The RIE or MaRIE unit 100*b* comprises a second housing 101. Alternatively or additionally, the second housing 101 comprises one or more openings (not shown) corresponding to the opening 32 of the housing 30. The opening 32 may be a sound inlet in the housing 30 in communication with a microphone (not shown), such as in communication with a microphone opening of a microphone (not shown), within the hearing device 100.

Figure 2A:
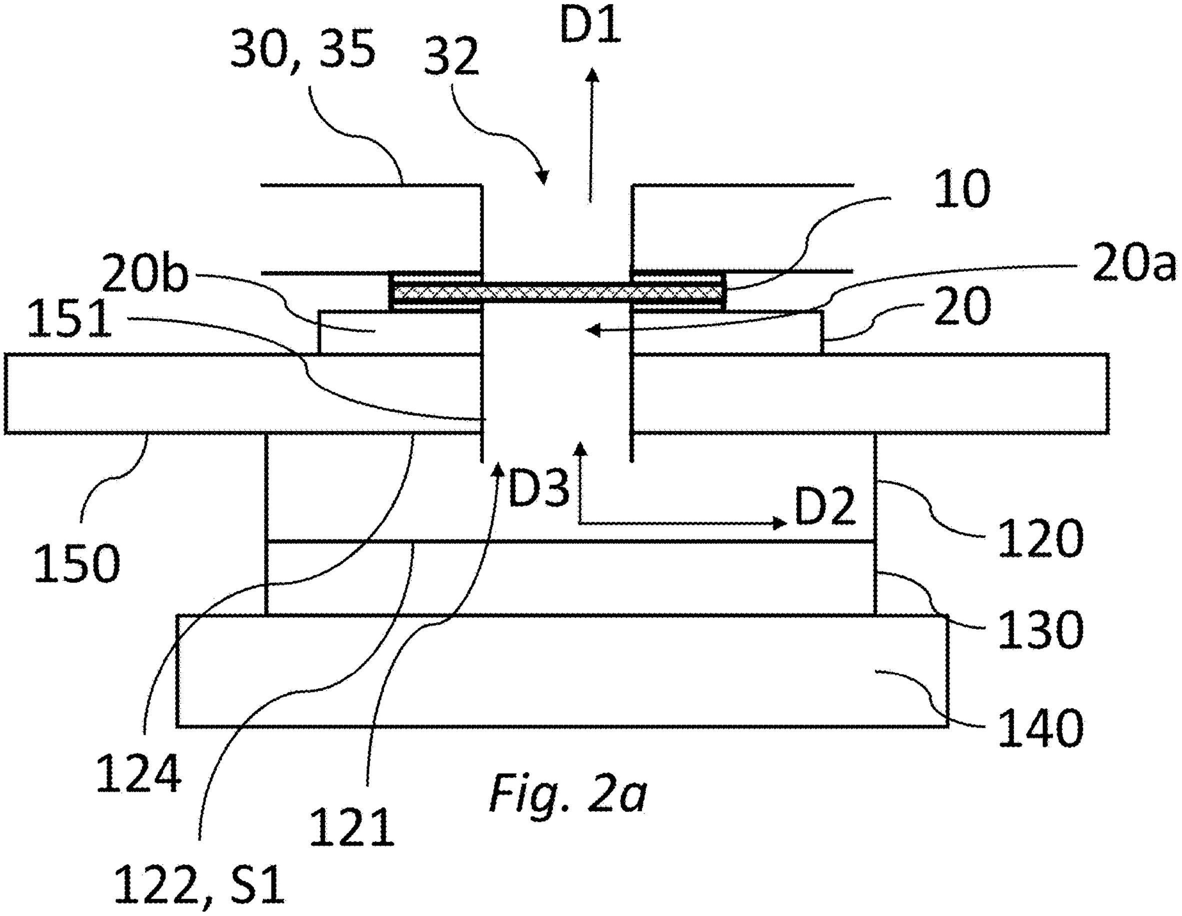

FIG. 2*a* schematically illustrates a cross-sectional view of an exemplary portion 35 of a housing 30 of a hearing device 100. FIG. 2*a* shows that the hearing device 100 further comprises a microphone 120. The microphone 120 is a bottom port microphone. The microphone 120 is arranged inside the housing 30. The microphone 120 is arranged adjacent to the opening 32 in the portion 35 of the housing 30. The microphone 120 is configured to receive sounds from the surroundings through the opening 32. The microphone 120 comprises a microphone opening 121. The microphone opening 121 is in communication with the opening 32 in the portion 35 of the housing 30. The microphone 120 opening is arranged in a second surface 124 of the microphone 120. In FIG. 2*a*, the microphone 120 may be mounted, such as soldered, to/on a PCBA 150. I.e. the second surface 124 of the microphone 120 may be mounted, such as soldered, to/on the PCBA 150. The PCBA 150 comprises a PCBA opening 151. The PCBA opening 151 may be arranged in between and/or in communication with the microphone opening 121 and the opening 32 in the portion 35 of the housing 30. The PCBA opening 151 may be aligned with the microphone opening 121 in a third direction D3. The PCBA opening 151 may be aligned with the microphone opening 121 and the opening 32 in the portion 35 of the housing 30 in the third direction D3. The hearing device 100 further comprises a force element 130. The force element 130 is arranged on a first side S1 of the microphone 120. FIG. 2*a* shows that the first side S1 is opposite to the housing 30 at the opening 32 in the housing 30. The first side S1 of the microphone 120 may correspond to a first surface 122 of the microphone 120. The first surface 122 of the microphone 120 being opposite the second surface 124 of the microphones 120. The force element 130 is configured to provide support for the microphone 120. The force element 130 may be configured to provide a force on the first side S1 of the microphone 120 forcing/pressing/urging the microphone 120 towards the portion 35 of the housing 30 of the hearing device 100. The applied force may be in the range of 0.1 N to 5 N.

FIG. 2*a* further shows that the opening 32 is configured to point towards the surroundings or in case of an in-ear microphone into the user's ear canal in a first direction D1, when the hearing device 100 is worn by a user in its intended position on/in/at the user's ear. FIG. 2*a* further shows that the first and/or second surface 122, 124 of the microphones 120 is configured to extend in a second direction D2. There may be an angle between the first direction D1 and the second direction D2. The angle may be between 45 degrees to 135 degrees. The angle may be about 90 degrees.

Figure 2B:
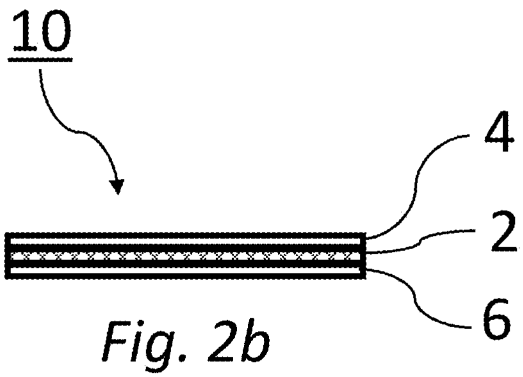
Figure 2C:
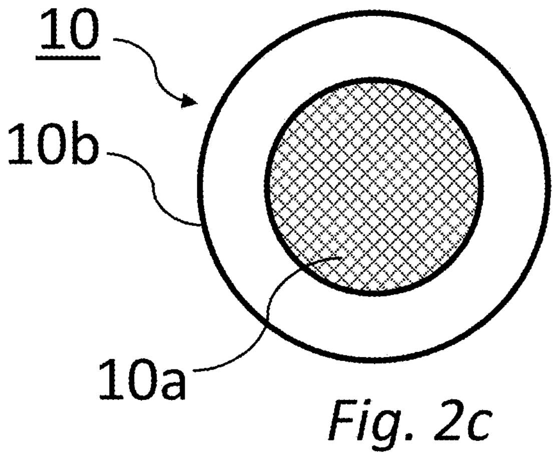

FIG. 2*a* further shows that the hearing device 100 may further comprise a filter device 10. FIG. 2*a* shows that the filter device 10 is arranged at the opening 32 in the portion 35 of the housing 30. FIG. 2*b* shows a magnified side view of the filter device 10. FIG. 2*b* shows that the filter device 10 comprises a mesh 2, a first adhesive element 4, and a second adhesive element 6. FIG. 2*c* shows a top view of the filter device 10 shown in FIG. 2*b*. FIG. 2*c* shows an open portion 10*a* of the filter device 10. The open portion 10*a* may be configured to allow sound passing through the mesh 2. FIG. 2*c* shows a closed portion 10*b* of the filter device 10. The closed portion 10*b* of the filter device 10 may be configured to prevent sound from passing through the mesh 2. The open portion 10*a* of the filter device 10 may be arranged in between and/or in communication with the microphone opening 121 and the opening 32 in the portion 35 of the housing 30. The open portion 10*a* of the filter device 10 may be aligned with the opening 32 in the portion 35 of the housing 30 in the first direction D1. The open portion 10*a* of the filter device 10 may be aligned with the microphone opening 121 in the third direction D3. The open portion 10*a* of the filter device 10 may be aligned with the microphone opening 121 and/or the opening 32 in the portion 35 of the housing 30 in the first and/or third direction D1, D3.

FIG. 2*a* further shows that the hearing device 100 may further comprise a sealing element 20. The sealing element 20 may be arranged adjacent to the filter device 10. The sealing element 20 may comprise an open portion 20*a* and a closed portion 20*b*. The open portion 20*a* of the sealing element 20 may be arranged in between and/or in communication with the microphone opening 121 and the opening 32 in the portion 35 of the housing 30. The open portion 20*a* of the sealing element 20 may be aligned with the opening 32 in the portion 35 of the housing 30 in the first direction D1. The open portion 10*a* of the sealing element 20 may be aligned with the microphone opening 121 in the third direction D3. The open portion 20*a* of the sealing element 20 may be aligned with the microphone opening 121 and/or the opening 32 in the portion 35 of the housing 30 in the first and/or third direction D1, D3.

FIG. 2*a* further shows that the hearing device 100 further comprises a support element 140 for the force element 130. The force element 130 may be arranged in between the microphone 120, such as the first side S1/first surface 122 of the microphone 120, and the support element 140. The force element 130 may be a foam, such as a compressible foam, wherein the foam may be in a compressed state when arranged in between the microphone 120 and the support element 140. The force element 130 may hereby provide a force in the third direction D3 on the microphone 120 forcing/pressing/urging the microphone towards the portion 35 of the housing 30 of the hearing device 100.

FIG. 2*a* further shows that the force element 130, the microphone 120, optionally the PCBA 150, optionally the sealing element 20 and optionally the filter device 10, are stacked in a respective order along the third direction D3 between the portion 35 of the housing 30 and the support element 140. The third direction D3 may be perpendicular to the second direction D2. In FIG. 2*a* the third direction D3 is parallel with the first direction D1. FIG. 2*a* further shows that the opening 32 in the portion 35 of the housing 30, the open portion 10*a* of the filter device 10, the open portion 20*a* of the sealing element 20, the PCBA opening 151 and/or the microphone opening 121 provides a sound path from the surroundings or ear canal of the user into the microphone 120. The sound path may have a center axis being parallel to the first and/or third direction D1, D3.

Figure 2D:
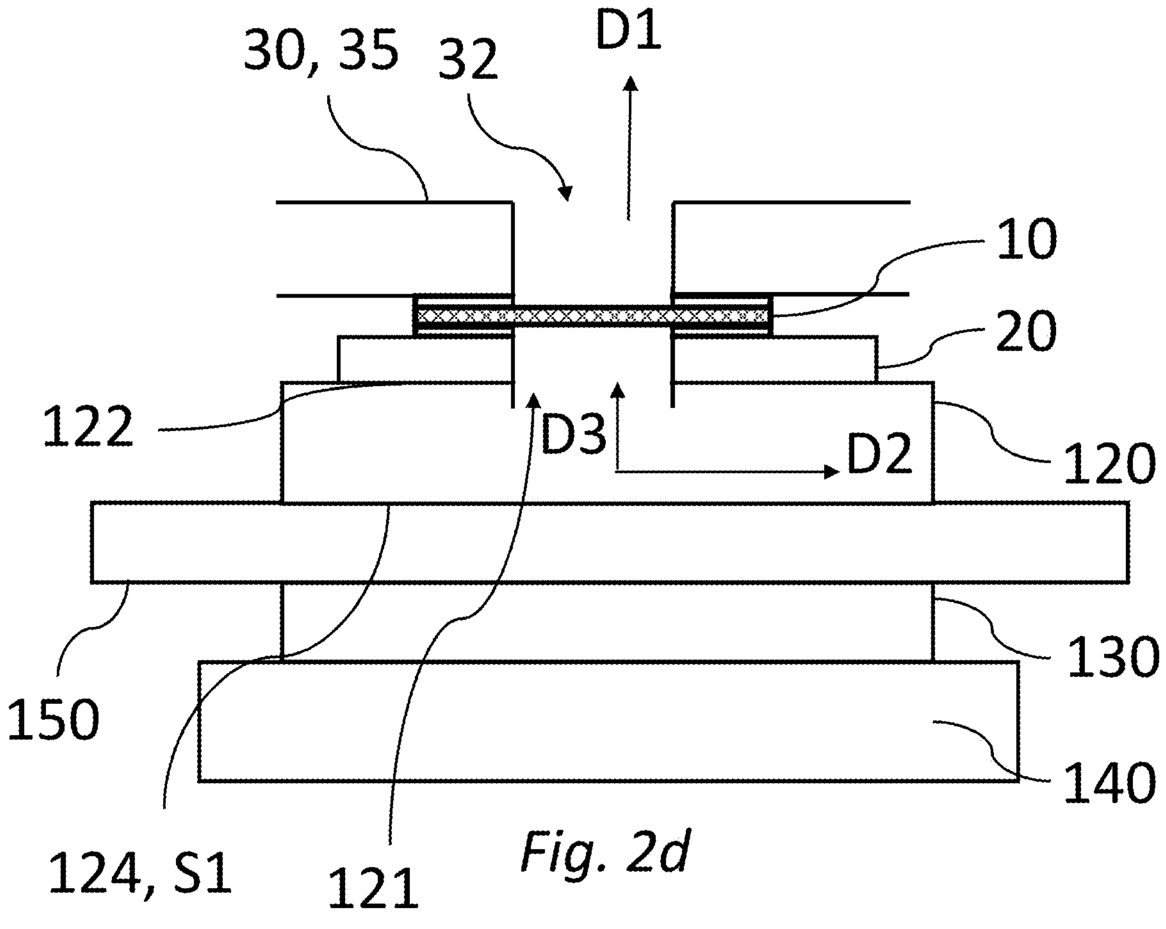

FIG. 2*d* schematically illustrates a cross-sectional view of an exemplary portion 35 of a housing 30 of a hearing device 100, wherein the force element 130, optionally the PCBA 150, the microphone 120, optionally the sealing element 20 and optionally the filter device 10, are stacked in another respective order along the third direction D3 between the portion 35 of the housing 30 and the support element 140. The microphone 120 is in this example a top port microphone wherein the microphone opening 121 is arranged in the first surface 122 of the microphone 120. The microphone 120 is arranged between the sealing element 20 and the PCBA 150. The second surface 124 of the microphone 120 may be mounted, such as soldered, to/on the PCBA 150. The force element 130 is arranged in between the first side S1 of the microphone 120 and the support element 140, i.e. between the PCBA 150 and the support element 140. The force element 130 is arranged in between a surface of the PCBA 150 opposite the surface of the PCBA facing the microphone 120 and the support element 140. The force element 130 may be a foam, such as a compressible foam, wherein the foam may be in a compressed state when arranged in between the PCBA 150 and the support element 140. The force element 130 may hereby provide a force in the third direction D3 on the microphone 120 forcing/pressing/urging the microphone towards the portion 35 of the housing 30 of the hearing device 100.

Figure 3A:
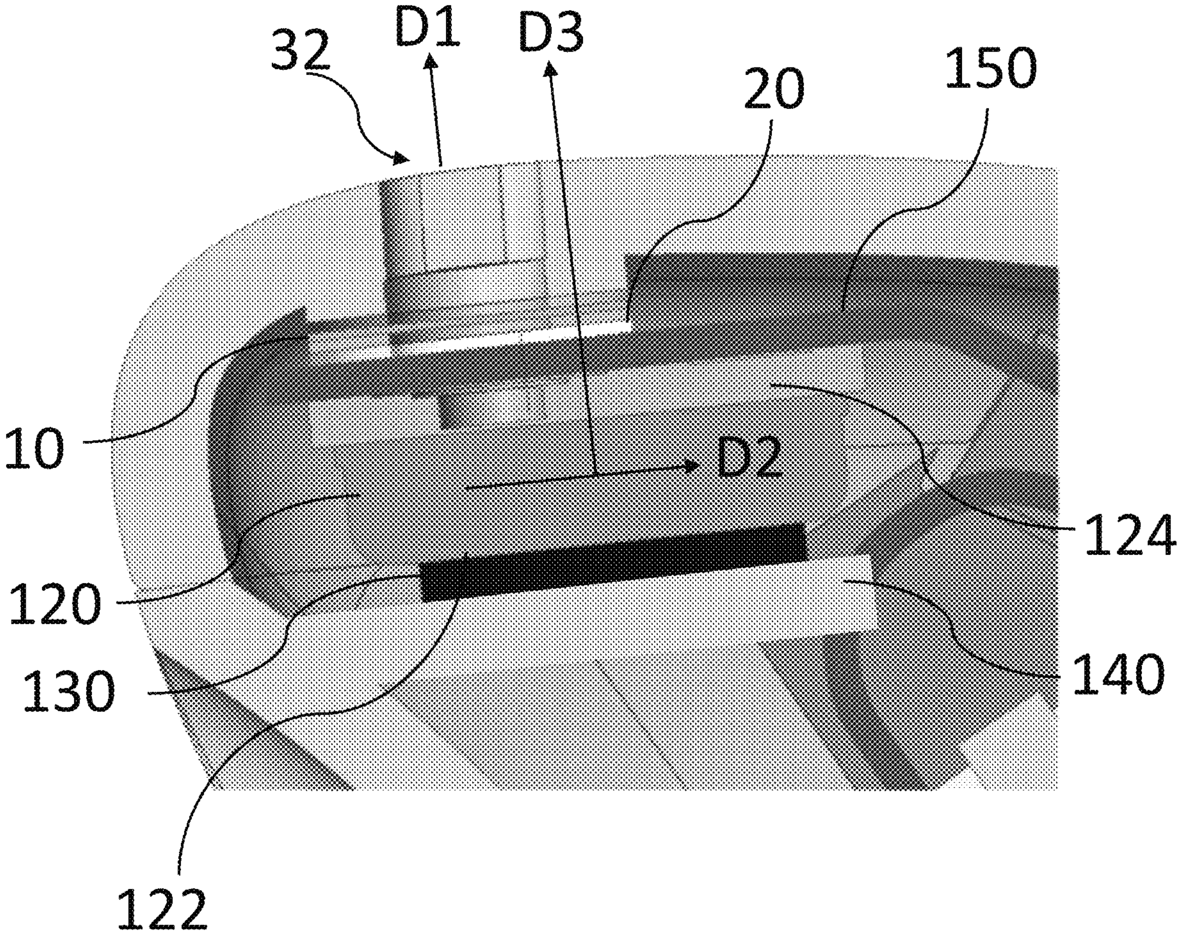
Figure 3B:
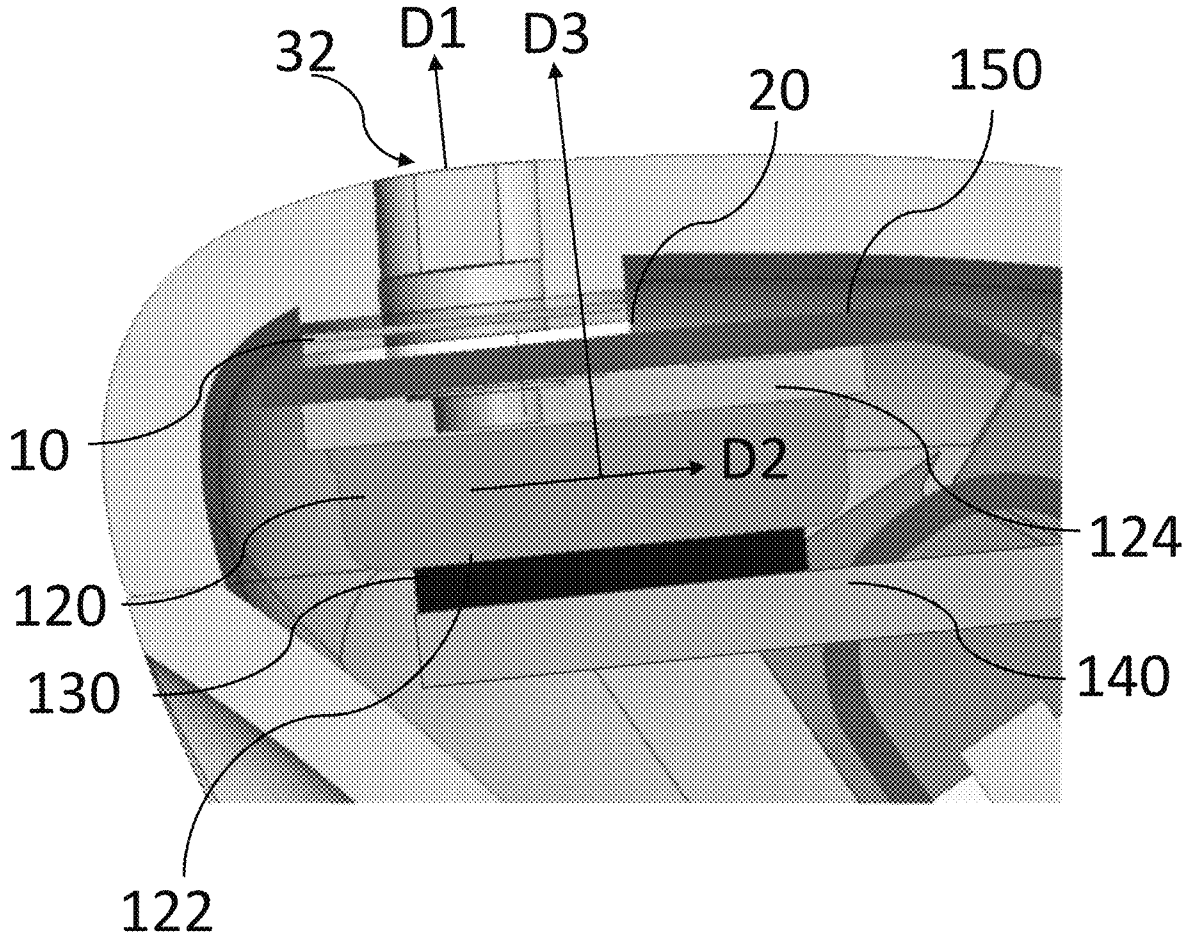

FIG. 3*a* illustrates another cross-sectional view of an exemplary portion 35 of a housing 30 of a hearing device 100. FIG. 3*b* illustrates another cross-sectional view of an exemplary portion 35 of a housing 30 of a hearing device 100. FIG. 3*a* shows components of the hearing device 100, similar to FIG. 2*a*. In FIG. 3*a*, the third direction D3 is parallel with the first direction D1. FIG. 3*b* shows another cross-sectional view of an exemplary portion 35 of a housing 30 of a hearing device 100. The support surface/element 140 may either be a surface/part of a frame structure in the hearing device 100, as shown in FIG. 3*a*. The support surface/element 140 may extend from the housing 30 of the hearing device 100, as shown in FIG. 3*a*. The support surface/element 140 may be a surface of another component within the hearing device 100, as shown in FIG. 3*b*.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items

1. A hearing device (100) comprising:
   a housing (30) comprising an opening (32) in a portion (35) of the housing (30),
   a microphone (120) arranged inside the housing (30) and arranged adjacent to the opening (32) in the portion (35) of the housing (30), the microphone (120) being configured to receive sounds from the surroundings through the opening (32), and
   a force element (130) arranged on a first side (S1) of the microphone (120), the first side (S1) being opposite to the housing (30) at the opening (32) in the housing (30), wherein the force element (130) is configured to provide support for the microphone (120).
2. The hearing device (100) according to item 1, wherein the force element is configured to provide a force on the first side (S1) of the microphone (120), urging the microphone (120) towards the portion (35) of the housing (30).
3. The hearing device (100) according to item 2, wherein the force is in the range of 0.1 N to 5 N.
4. The hearing device (100) according to items 1 to 3, wherein the force element (130) is configured to take up tolerances and/or to provide vibration dampening, and/or provide shock absorbance, and/or provide an acoustic sealing.
5. The hearing device (100) according to any of the preceding items, wherein the opening (32) in the portion (35) of the housing (30) is configured to point towards the surroundings in a first direction (D1), when the hearing device (100) is worn by a user in its intended position in/at the user's ear and/or wherein the opening (32) in the portion (35) of the housing (30) is configured to point into the users ear canal in a first direction (D1), when the hearing device (100) is worn by a user in its intended position in/at the user's ear.
6. The hearing device (100) according to any of the preceding items, wherein the microphone has a microphone opening (121) in a first or second surface (122, 124) of the microphone (120), the first or second surface (122, 124) being configured to extend in a second direction (D2).
7. The hearing device (100) according to item 6, wherein there is an angle between the first direction (D1) and the second direction (D2), the angle being between 45 degrees to 135 degrees.
8. The hearing device (100) according to item 6 or 7, wherein a third direction is perpendicular to the second direction (D2).
9. The hearing device (100) according to item 8, wherein the force element is configured to urge the microphone towards the housing (30) of the hearing device (100) in the third direction (D3).
10. The hearing device (100) according to any of the preceding items, wherein the hearing device (100) further comprises a support element (140) for the force element (130).
11. The hearing device (100) according to any of the preceding items, wherein the force element (130) comprises a foam.
12. The hearing device (100) according to item 11, wherein the foam is a compressible foam.
13. The hearing device (100) according to item 12, wherein a thickness the foam in an uncompressed state is in the range of 0.4 mm to 10 mm, such as 0.8 mm to 5 mm, such as 1.6 mm to 2.5 mm, such as 1 mm along the third direction (D3).
14. The hearing device (100) according to items 11-13, wherein the foam has a density in the range of 100 $kg/m^3$ to 500 $kg/m^3$, such as 200 $kg/m^3$, such as 300 $kg/m^3$, such as 400 $kg/m^3$.
15. The hearing device (100) according to items 12-14, wherein the compressible foam has a compression in the range of 5% to 80% such as 10% to 70%, such as 20% to 60%, such as 30% to 50%, such as 40%.
16. The hearing device (100) according to items 12-15, wherein the compressible foam in a compressed state is configured to provide a force on the first side (S1) of the microphone (120), the force being in the range of 0.1 N to 5 N.
17. The hearing device (100) according to any of the preceding items, wherein the hearing device (100) further comprises a filter device (10), wherein the filter device (10) is arranged at the opening (32) in the portion (35) of the housing (30).
18. The hearing device (100) according to any of the preceding items, wherein the hearing device (100) further comprises a sealing element (20), wherein the sealing element (20) is arranged adjacent to the filter device (10).
19. The hearing device (100) according to items 8-18, wherein the force element (130), the microphone (120) and the filter device (10), are stacked in the respective order along the third direction (D3) between the support element (140) and the portion (35) of the housing (30).

LIST OF REFERENCES

10 Filter device
10*a* Open portion of filter device
10*b* closed portion of filter device
20 Sealing element
20*a* Open portion of sealing element
20*b* Closed portion of sealing element
30 Housing
32 Opening
35 A portion of housing
100 Hearing device
100*a* BTE unit
100*b* RIE/MaRIE unit
101 Second housing
120 Microphone
12 Microphone opening
122 First surface of microphone
124 Second surface of microphone

130 Force element
140 Support element
150 Printed circuit board assembly (PCBA)
151 PCBA opening
D1 First direction
D2 Second direction
D3 Third direction
S1 First side of the microphone

The invention claimed is:

1. A hearing device comprising:
a housing comprising a portion;
an opening at the portion of the housing;
a microphone inside the housing and adjacent to the opening at the portion of the housing, the microphone being configured to receive sound from a surrounding through the opening at the portion of the housing; and
a force element configured to provide support for the microphone, wherein the microphone is between the force element and the portion of the housing, wherein the housing is a behind-the-ear housing, and the force element is inside the behind-the-ear housing.

2. The hearing device according to claim 1, wherein the force element is on a first side of the microphone, the first side being opposite to a second side of the microphone, wherein the opening at the portion of the behind-the-ear housing is closer to the second side of the microphone than to the first side of the microphone.

3. The hearing device according to claim 2, wherein the force element is configured to provide a force on the first side of the microphone, urging the microphone towards the portion of the behind-the-ear housing.

4. The hearing device according to claim 3, wherein the force is anywhere from 0.1 N to 5 N.

5. The hearing device according to claim 1, wherein the force element is configured to take up tolerances and/or provide vibration dampening, and/or provide shock absorbance, and/or provide an acoustic sealing.

6. The hearing device according to claim 1, wherein the opening at the portion of the behind-the-ear housing is configured to face towards the surrounding in a first direction, wherein the microphone has a microphone surface and a microphone opening at the microphone surface of the microphone, the microphone surface extending in a second direction, wherein an angle between the first direction and the second direction is anywhere from 45 degrees to 135 degrees.

7. The hearing device according to claim 6, wherein the force element is configured to urge the microphone towards the portion of the behind-the-ear housing in a third direction that is different from the second direction.

8. The hearing device according to claim 7, wherein the third direction is perpendicular to the second direction.

9. The hearing device according to claim 6, further comprising a filter device, and a support element for the force element;
wherein the force element, the microphone, and the filter device, are between the support element and the portion of the behind-the-ear housing.

10. The hearing device according to claim 9, wherein the microphone is between the force element and the filter device.

11. The hearing device according to claim 10, wherein the force element, the microphone, and the filter device form a stacked configuration along a third direction that is different from the second direction.

12. The hearing device according to claim 1, further comprising a support element for the force element.

13. The hearing device according to claim 1, wherein the force element comprises a foam.

14. The hearing device according to claim 13, wherein the foam is a compressible foam.

15. The hearing device according to claim 13, wherein a thickness of the foam in an uncompressed state is anywhere from 0.4 mm to 10 mm.

16. The hearing device according to claim 15, wherein the thickness of the foam in the uncompressed state is anywhere from 0.8 mm to 5 mm.

17. The hearing device according to claim 13, wherein the foam has a density anywhere from 100 kg/m$^3$ to 500 kg/m$^3$.

18. The hearing device according to claim 13, wherein the foam is compressible by a compression amount that is anywhere from 5% to 80%.

19. The hearing device according to claim 13, wherein the foam in a compressed state is configured to provide a force on the first side of the microphone, the force being anywhere from 0.1 N to 5 N.

20. The hearing device according to claim 1, further comprising a filter device, wherein the filter device extends perpendicularly with respect to an axis of the opening.

21. The hearing device according to claim 1, further comprising a sealing element, wherein the sealing element is between the microphone and the portion of the behind-the-ear housing.

22. The hearing device according to claim 1, wherein the force element has a first support surface and a second support surface opposite from, and parallel to, the first support surface, and wherein the first support surface of the force element extends over a majority of a surface of the microphone while the second support surface of the force element is facing towards a support element.

* * * * *